United States Patent [19]

Regehr

[11] 4,334,231

[45] Jun. 8, 1982

[54] NON IMPACT DISPLAY SCREEN OUTPUT PRINTER

[75] Inventor: John L. Regehr, Stewartville, Minn.

[73] Assignee: International Business Machines Corporation, Armonk, N.Y.

[21] Appl. No.: 144,499

[22] Filed: Apr. 28, 1980

Related U.S. Application Data

[63] Continuation-in-part of Ser. No. 973,212, Dec. 26, 1978, abandoned.

[51] Int. Cl.³ ..................... G01D 9/00; G01D 15/10
[52] U.S. Cl. .................................. 346/35; 340/716; 340/798; 346/76 PH
[58] Field of Search .............. 346/76 PH, 33 R, 35, 346/154; 358/296; 340/716, 717, 798, 799, 800, 801; 400/120; 364/518, 519, 521

[56] References Cited

U.S. PATENT DOCUMENTS

| | | | |
|---|---|---|---|
| 3,373,437 | 3/1968 | Sweet | 346/75 |
| 3,945,019 | 3/1976 | Ueno | 346/154 |
| 4,141,018 | 2/1979 | Mizuguchi | 346/76 PH |
| 4,158,203 | 6/1979 | Johnson | 346/76 PH X |

Primary Examiner—Joseph W. Hartary
Attorney, Agent, or Firm—Robert W. Lahtinen

[57] ABSTRACT

A convenient hard copy output of a cathode ray tube (CRT) screen display is provided by a thermal printer which prints a line of dots equal in number to the number of dots in one raster scan on the CRT screen by printing the serial digital information in one such raster scan, as generated by the display device prior to incorporation into a composite video signal, during each refresh cycle of the screen until the entire screen content has been reproduced. Use of one line during each refresh cycle enables the reproduction of the screen content by gating the serial data from the display control circuitry without the need for a separate character generator or the related circuitry and also accommodates the use of an interlaced raster.

7 Claims, 13 Drawing Figures

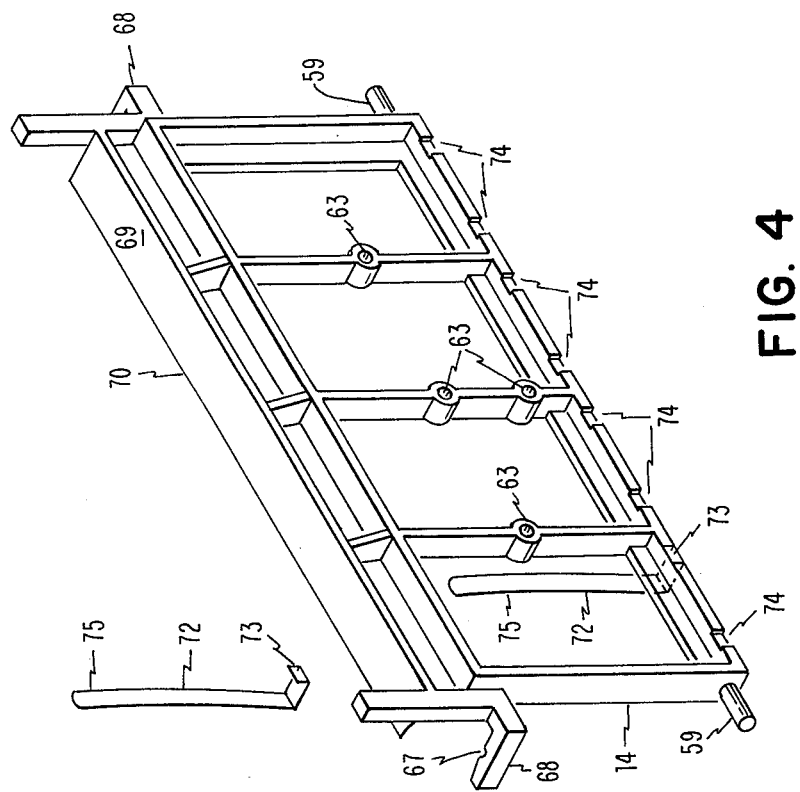
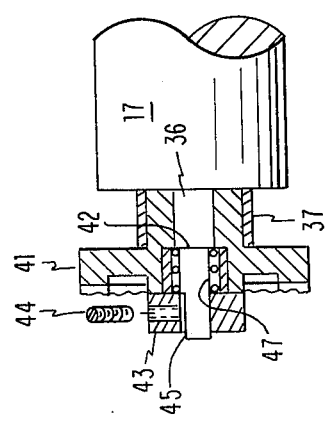
FIG. 4
FIG. 3

NON IMPACT DISPLAY SCREEN OUTPUT PRINTER

DESCRIPTION

This is a continuation in part of application Ser. No. 973,212 filed Dec. 26, 1978 and now abandoned.

BACKGROUND OF THE INVENTION

This invention pertains to thermal printers and more particularly to a display output printer for printing the content of a display screen.

Previously when it has been desired to print the content of a display screen to provide a permanent hard copy it has been necessary to transfer the data content of the display to a memory and thereafter use the stored data as the basis for actuating a printer to generate a hard copy. This involved discrimination between displayable characters and other data, character generation and data manipulation for display or print in both devices thereby duplicating numerous functions.

SUMMARY OF THE INVENTION

The printer display of the present invention provides a low cost, quiet, compact, single hard copy output of CRT displayed information. Using a line-of-dots thermal printer with a solid state print head, screen information is printed on-the-fly on thermally sensitive roll paper fed past the print head by a motor driven platen. The CRT circuitry receives serial digital information data, horizontal blanking data and vertical blanking data from the associated device which is combined using a train of clock pulses to form a composite video signal. By using the serial digital information data before the generation of the composite video signal it is possible to gate a line of raster information simultaneously to both the CRT circuitry and the printer circuitry. Further, the same control signals for horizontal blanking and retrace, the vertical blanking and retrace and the same train of clock pulses are transmitted to both the CRT circuitry and the printer circuitry. This not only saves the redundancy of circuits, but also the additional logic and timing circuits that would be required to synchronize printer and display that would be required if separate signals were generated.

The printer uses the same serial digital data that the display control circuitry transmits to the cathode ray tube circuitry for visual display. One line of data is gated to the print buffer and printed during each refresh cycle by a line of thermal print dots equal in number to the number of dots in each raster scan line of data. The printer thereby prints the content of the display screen without the necessity of duplicating the character generator circuit and other circuitry for preparation of data in serial bit form. The printer is also insensitive to whether the scan data is from a device that scans raster lines sequentially or utilizes an interlaced raster. In addition the all points addressable characteristic of the printer affords versatile printing capability as the device is able to reproduce graphics with the same ease as characters or symbols, allowing for ease in interface and attachment.

BRIEF DESCRIPTION OF THE DRAWINGS

FIG. 3 is a section view through the axis of the helicon platen drive gear of FIG. 2 also including the overrunning clutch for one way drive of the platen shaft.

FIG. 4 is an isometric view of the stiffner for mounting the print head card.

DETAILED DESCRIPTION

Figure 1:
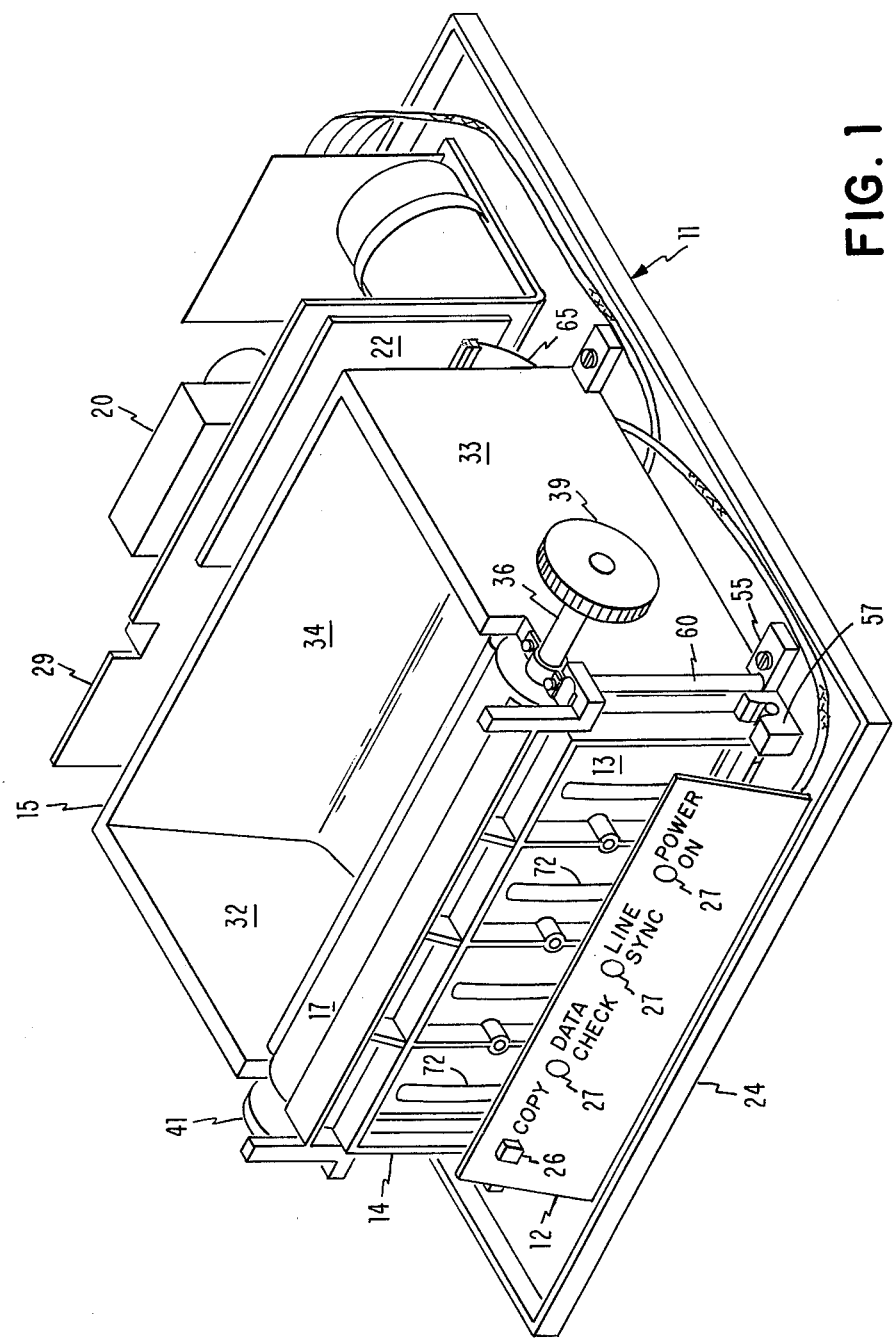
FIG. 1 is an isometric view of the thermal printer assembly used in the present invention showing the frame and subassemblies mounted thereon and with the cover removed.

The printer 11 includes a control panel 12, a print head card 13 mounted on a stiffner or frame 14, a paper cradle 15 that carries a platen 17 and a driving motor 19 (FIG. 2), and a power supply 20 on which is mounted an interface logic card 22. Each of these assemblies is mounted on and carried by a frame 24.

The control panel 12 carries the operating switches and indicator signals. Exemplary of such would be a copy switch 26 to initiate a print cycle and indicator lights 27 indicative of operating conditions such as a data check, line sync or power on.

At the rear of the printer assembly is a power supply 20 mounted on a formed metal plate 29 that provides both electrical shielding and a subframe for the power supply assembly. Secured to the plate 29 by stand off clips (not shown) is a printed circuit card 22 that carries the interface logic circuitry for printer 11.

Figure 2:
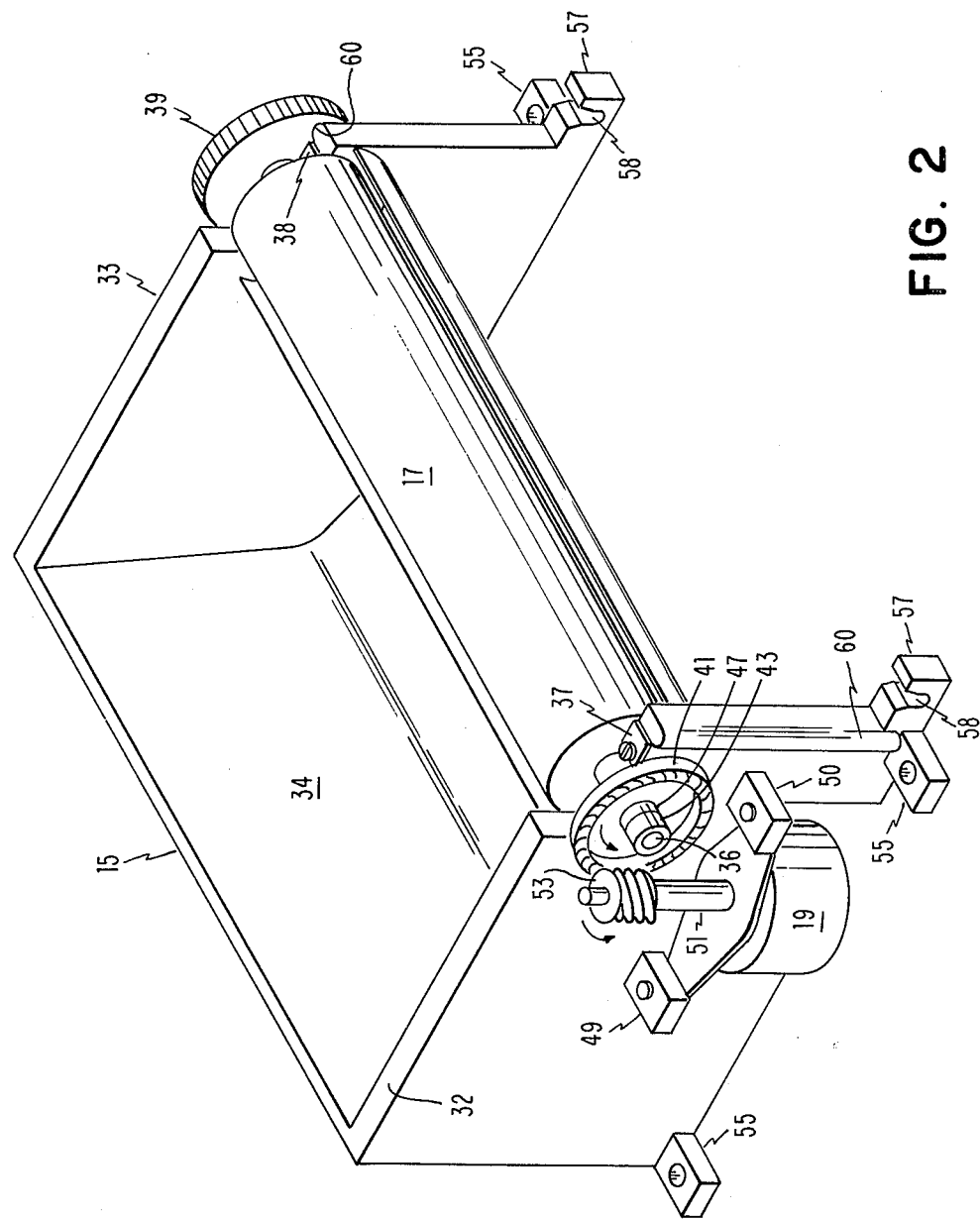
FIG. 2 is an isometric view of the platen, drive motor and paper cradle subassembly of FIG. 1.

As shown in FIG. 2, the paper cradle 15 has side walls 32, 33 interconnected by a curved wall 34 which forms a recess for receiving and confining a roll of paper. A platen 17 has a shaft 36 extending from each axial end and is mounted on side walls 32, 33 by bearings 37, 38 respectively which receive such shaft 36. A thumb wheel 39 is secured to one end of shaft 36 for movement in unison therewith to provide for manual advance of the paper. Adjacent the opposite end of shaft 36 is mounted a helicon face gear 41 which is retained between the shoulder 42 where shaft 36 is reduced in diameter and the collar 43 which includes a set screw 44 (FIG. 3) that engages a flatted surface 45 on the shaft 36 in the assemblied condition. An overrunning clutch 47 is pressed into the central bore of gear 41 and cooperates with shaft 36 to permit the shaft to rotate in a counter clockwise direction as viewed in FIG. 2 while preventing clockwise rotation. The platen 17 can thus be rotated to advance the paper media through manipulation of thumb wheel 39 independently of the movement of gear 41.

Mounted on ears 49, 50 extending from side wall 32 and formed as an integral part thereof is a synchronous motor 19. The output shaft 51 of motor 19 carries a helicon pinion or worm gear 53 that engages face gear 41 to impart rotatory motion to platen 17. Paper cradle 15 also has formed as an integral part thereof four apertured projections 55 which provide for mounting the paper cradle platen assembly on the printer frame 24. Projections 57 have upwardly facing U shaped openings 58 for receiving trunions 59 of the print head card stiffner 14 (FIG. 4). Also formed as integral parts of the side walls 32, 33 are detent ridges 60.

Figure 5:
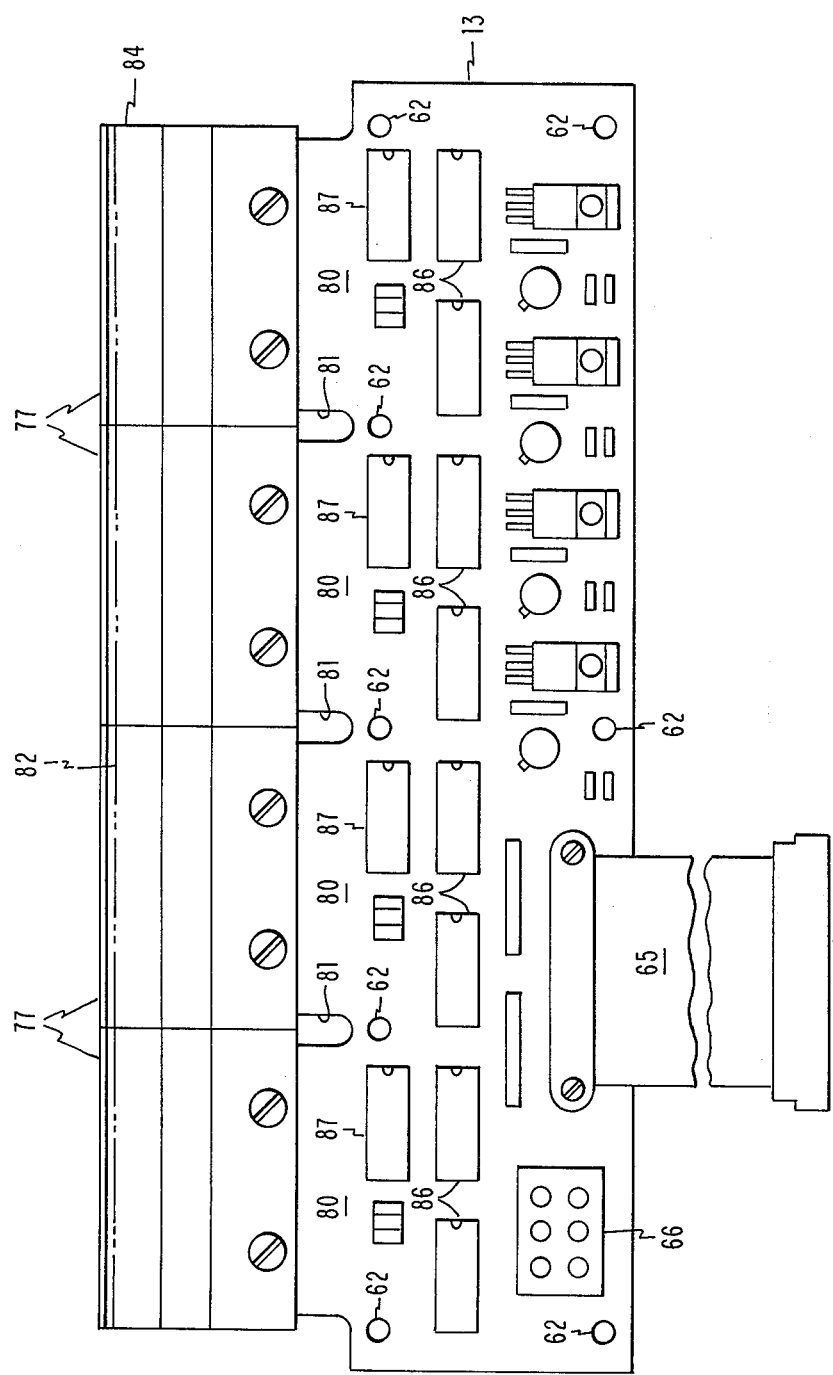
FIG. 5 is an elevation of the print head card.

FIG. 4 shows the print head card stiffner 14 which is molded as a single part. The print head card 13 (FIG. 5) shows the side which confronts the platen and is mounted on the stiffner at the rear of the side in FIG. 4. Print head card 13 is secured to stiffner 14 by either clips or screws (not illustrated) that extend through card apertures 62 and are received in stiffener bores 63 (some of which are visible). Print head card 13 is electrically connected to logic card 22 by a flat cable 65 and to the power supply 20 by cabling which is attached to voltage connector 66. The stiffener further includes trunions 59 which are received in paper cradle openings 58 and detent recesses 67 in arms 68 which engage the detent ridges 60. The trunions 59 and detents 67 function to retain the print head card 13 mounted on stiffener 14 in an operating position confronting platen 17. Stiffener 14 also includes an upper portion 69 of wedge shaped cross section that presents a tear edge 70 for severing a projecting length of paper from the supply roll. Mounted on stiffener 14 are a series of eight spring elements 72 which have turned lower ends 73 that are received in and positioned by stiffener slots 74 and have upper ends 75 which engage the print head card 13 at the rear of the print heads 77 to urge the print heads toward platen 17 when in the assembled operating condition to assure conforming contact with the thermal print paper 78 trained over platen 17. Print head card 13 terminates upwardly in 4 cantilevered portions separated by slots 81. Each cantilevered portion 80 carries one of the print heads 77.

Print head card 13 contains the print circuitry to actuate and control the thermal print head 77. Voltage connector 66 interconnects the printer circuits with the power supply 20. The lines of the flat cable 65 interconnect the printer circuits on the print head card 13 with the interface logic on card 22 for receipt of control and data signals. The four print heads 77 present a continuous line of thermal print dots 82 which aggregate in total the number of thermal dot positions forming one line of a dot matrix print line. Each print head comprises a metalized ceramic substrate 84, the land patterns of which are connected to the conductive land patterns of the printed circuit board forming the print head card 13. Print head card 13 carries a series of large scale integration (LSI) modules 86 which contain the print head drivers and other LSI modules 87 which contain address counters.

Figure 6:
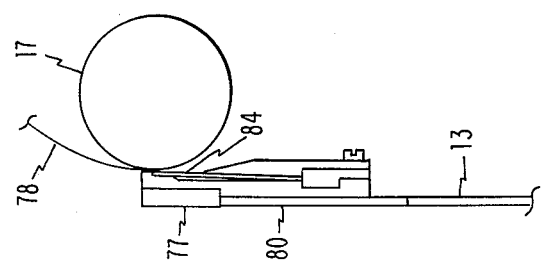
FIG. 6 is a side elevation of the print head card print head assembly showing its cooperation with the platen and thermal print media.

As seen in FIG. 6 the print head card 13 and the thermal print heads 77 are biased toward platen 17 in the operating condition. The print head card assembly is biased toward tangency with the platen along the line of the thermal print dots 82 to hold the paper media captive therebetween causing the thermal print heads 77 to be the pressure pad that assures that the paper moves in unison with the platen surface while concurrently assuring closely conforming thermal printing contact between the print dots 82 and the thermal paper media 78.

Figure 8:
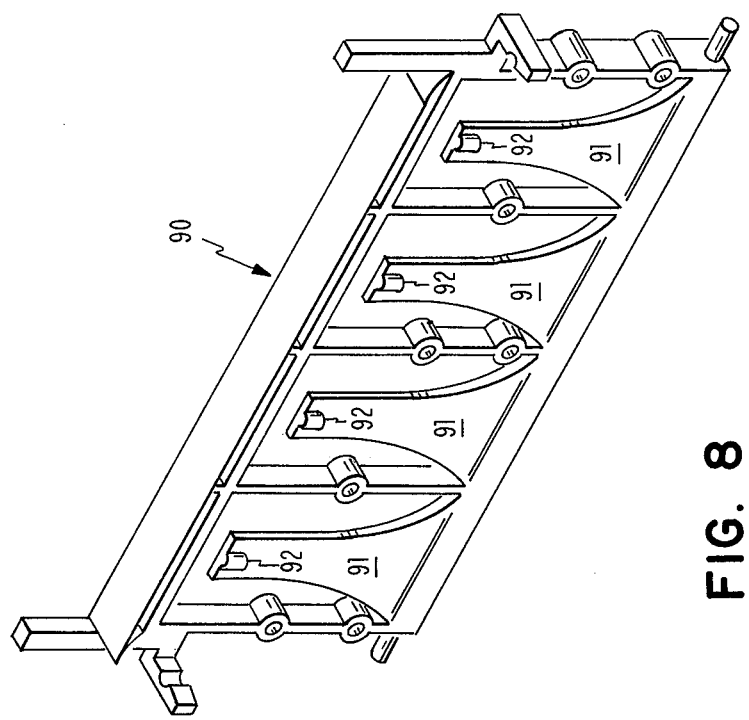
FIG. 8 is an alternative embodiment for the stiffner of FIG. 4 showing the biasing structure molded as an integral part thereof.

FIG. 8 shows a modified print head card stiffener 90 wherein the print head biasing elements 91 are molded as an integral part of the stiffener. Each of the elements 91 inclines slightly outward from the print head card mounting plane and includes at the distal end a semicylindrical projection 92 that engages the confronting thermal print head centrally at its rear surface and rockably biases the print head toward close conformity with the platen surface and thermally sensitive paper 78. Each of the thermal print heads 77 is mounted on a cantilevered projection 80 separated from the adjoining projection by a slot 81. The cantilevered projections 80 afford sufficient flexibility to enable torisonal adjustment induced by the biasing elements 91 to achieve the necessary adjustment.

The mode of operation of the printer in printing a sequence of lines of thermal print dots enables the device to print out the content of a CRT screen display by printing a sequence of lines on the thermal print medium 78 which reproduces the sequence of raster lines of dots on the CRT screen. This is accomplished by the printer shown and described herein by printing one raster line of data during each refresh cycle of the CRT. Printer control 107 gates the serial data associated with the first raster scan line of the CRT display during an initial refresh cycle and thereafter gates the respective next raster scan line serial data during each succeeding refresh cycle. The use of successive refresh cycles also makes it immaterial whether the CRT refreshes successive lines or uses an interlaced raster. The printer logic circuits are also simplified in this approach to a CRT screen print application since the serial data supplied to the CRT is used concurrently by the printer eliminating the need for duplicate character generators and associated circuitry.

Figure 10:
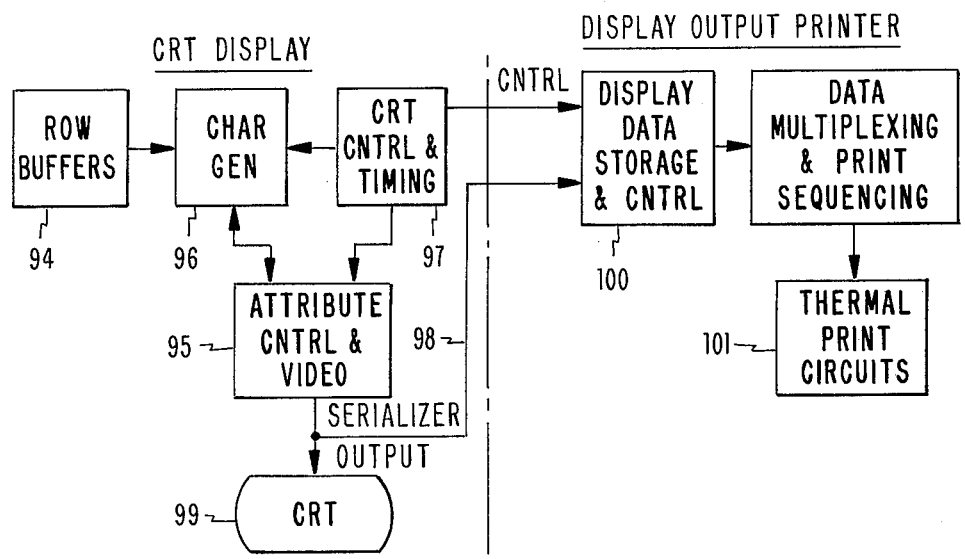
FIG. 10 is a schematic logic circuit showing portions of the display and associated printer circuitry.

FIG. 10 schematically illustrates the circuit relationship between a raster scan CRT display and the thermal screen printer. The display controller includes row buffers 94 that are loaded from a random access memory (not shown). Serial output on line 98 from a serializer within attribute control and video 95 is generated using data from character generator 96 and control from control and timing circuits 97. The serializer output data on line 98 which goes to CRT 99 is also transmitted to the display printer data storage and control 100 from which it is multiplexed and transmitted to the thermal print circuits 101.

Figure 7:
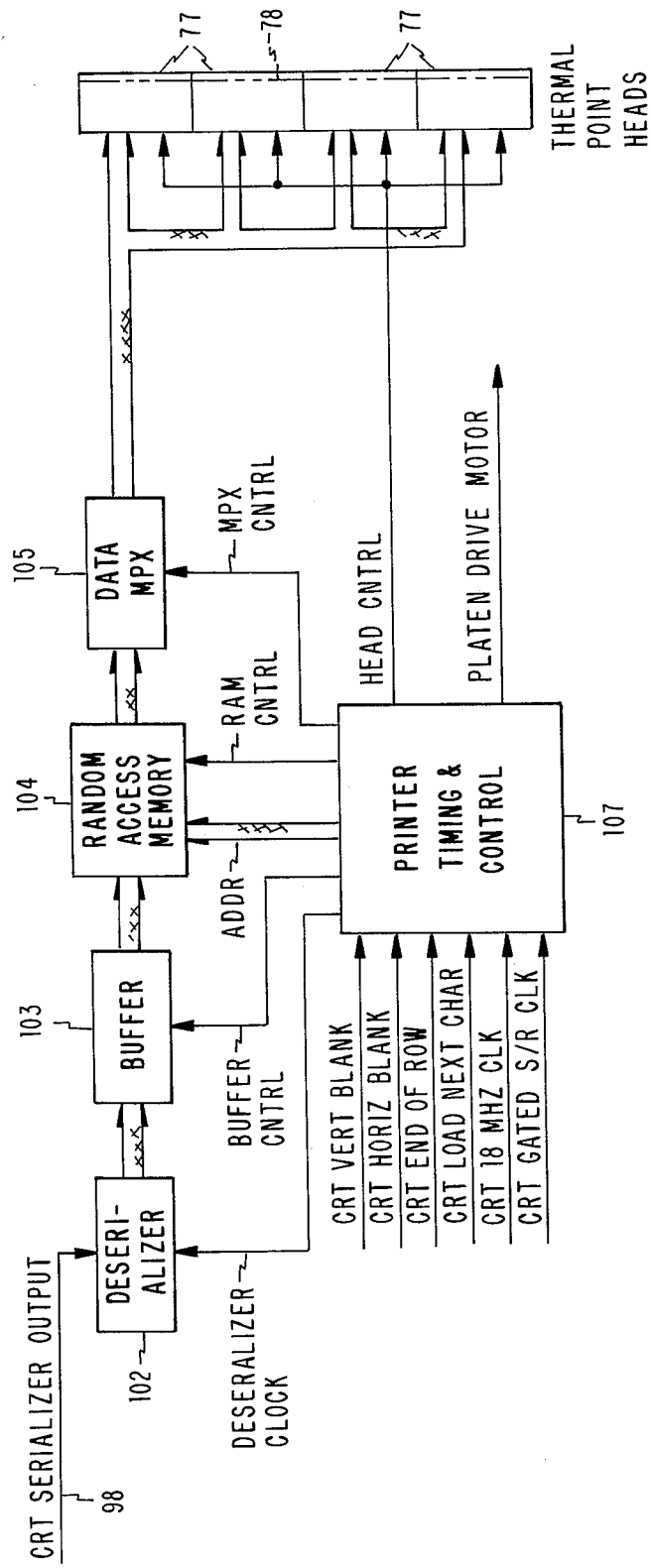
FIG. 7 is a schematic circuit diagram showing the printer interface logic for handling data from an associated display.

FIG. 7 illustrates logic circuitry for adapting the printer for the output printing of the content of a raster scan CRT display. The serial data on line 98 transmitted to the CRT is also connected to a deserializer shift register 102. The serial data to the CRT is continuously received also by the shift register 102 but is gated to buffer 103 only when a print operation is occurring and the data associated with the line to be printed is being received by shift register 102. The serial data is transferred from register 102 to buffer 103 and from there is store in the random access memory (RAM) 104 until the 800 bits for one line of thermal dot printing have been received. The line of data is transmitted to the print head 77 by the multiplexer circuits 105. The multiplexer 105 selectively gates the data to the thermal print dots drivers in accordance with the needs of the system. Although the thermal print dots 82 constitute one continuous row of dots transverse to the direction of motion of the paper media or one raster scan of the CRT screen, various blocks of print dots are often staggered in the direction of paper travel to enable non simultaneous actuation. This is accommodated by the multiplexer to cause all dots in one line of data to appear on a single straight line of the print media.

Various control signals are also received by the printer timing and control circuitry 107 from the CRT display control logic to enable the printer to coordinate the printing of the data on the CRT. In addition to receiving, selecting, storing and multiplexing the print data, the printer control logic also controls the start and stop of the platen drive motor 19. The motor speed is coordinated to the print operation to cause the paper to advance a distance between the lines of printed dots approximately equal to the distance between adjacent dots with any line of dots. Thereby the aspect ratio is maintained between characters or other information displayed on the CRT screen and printed on the thermal print medium to give a faithful reproduction.

Figure 9:
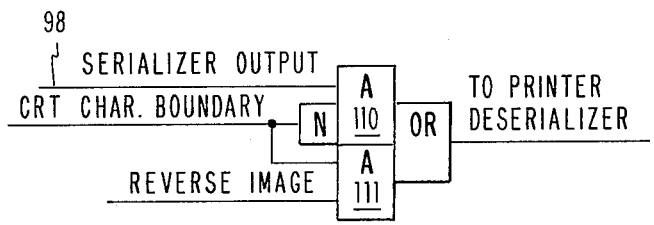
FIG. 9 is a circuit for modification of the serial output data received by the printer to selectively eliminate non-character information on the display screen from the printer hard copy output.

Since the printer prints all the information appearing the CRT screen on a raster dot basis, the printer is not sensitive to language, character or symbols and will also print equally accurately graphic information. In some circumstances it may be desired not to print all indicia appearing on the CRT screen. For example, displayed characters may each appear within a dot matrix defined within a larger matrix which also includes a character boundary or space between adjoining characters. This space or character boundary may be used for displaying prompting, field information or character positions within a field. When it is not desired that such information appear in the printed record of the screen content it will be necessary to interpose a control circuit to selectively suppress the printer operation. An example is shown in FIG. 9. Here AND block 110 is used to suppress the printing of data or information found in the character boundary space; however the boundary space is illuminated by satisfying AND block 11 when a reverse image signal is present to prevent a distortion of the screen image when it is desired to display dark or blanked characters on an illuminated or unblanked background.

Figure 11:
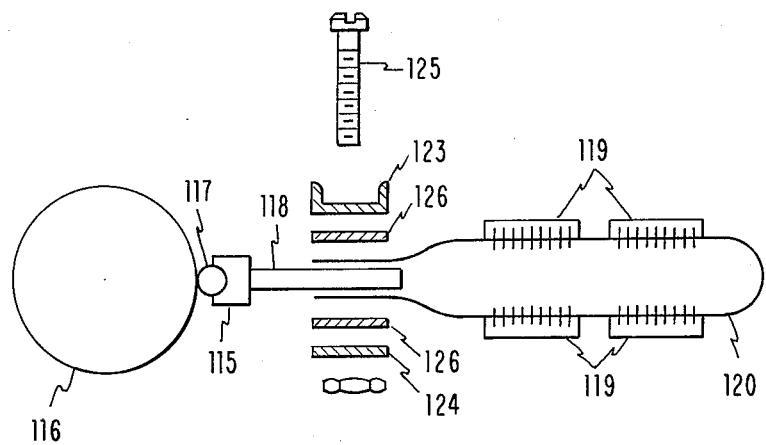
FIG. 11 is a vertical section of a partially exploded schematic view of a display printer of a second embodiment incorporating the invention.
Figure 12:
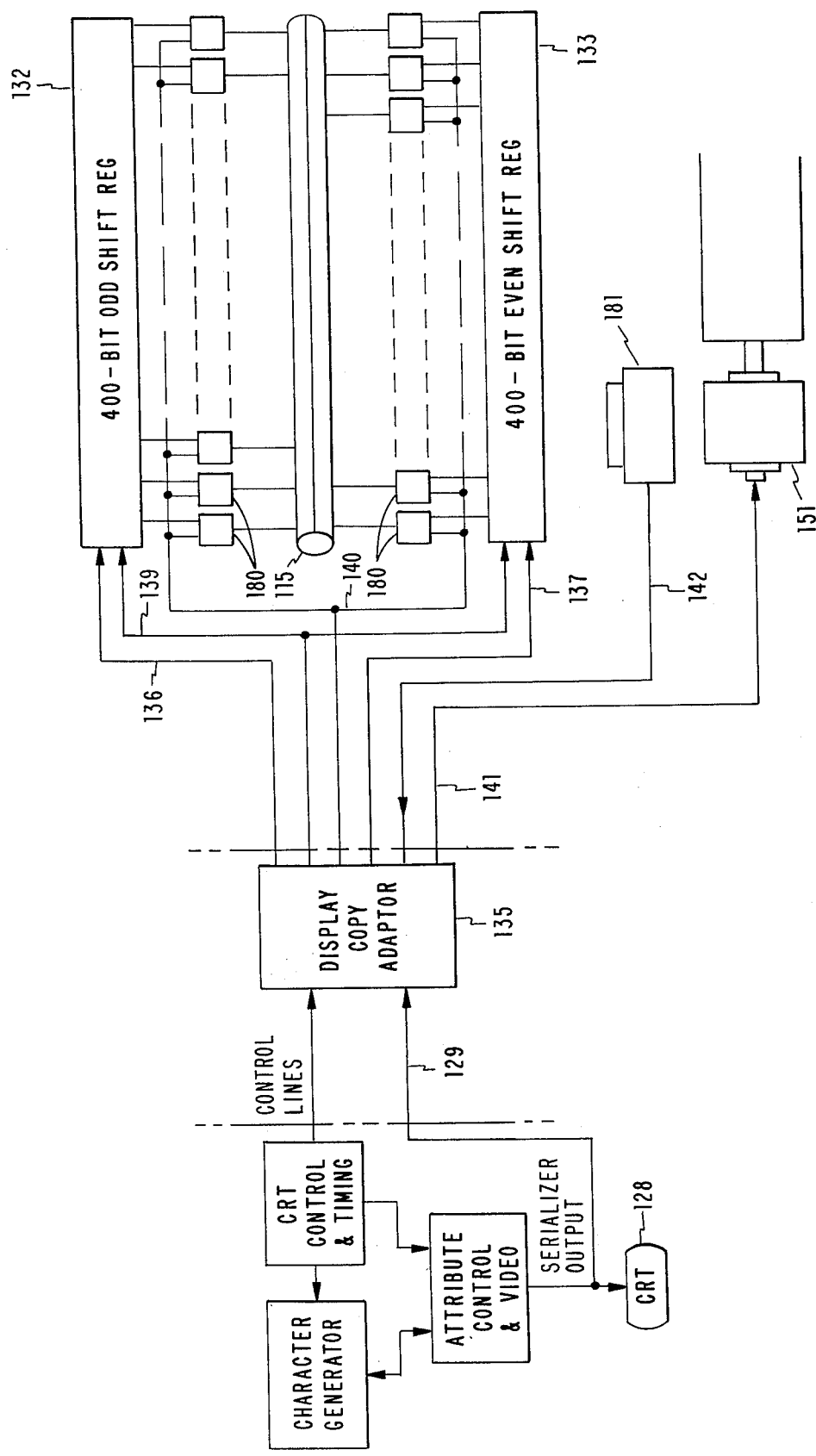
FIG. 12 is a block diagram showing logic circuit portions of the CRT display and the printer of the embodiment of FIG. 11.
Figure 13:
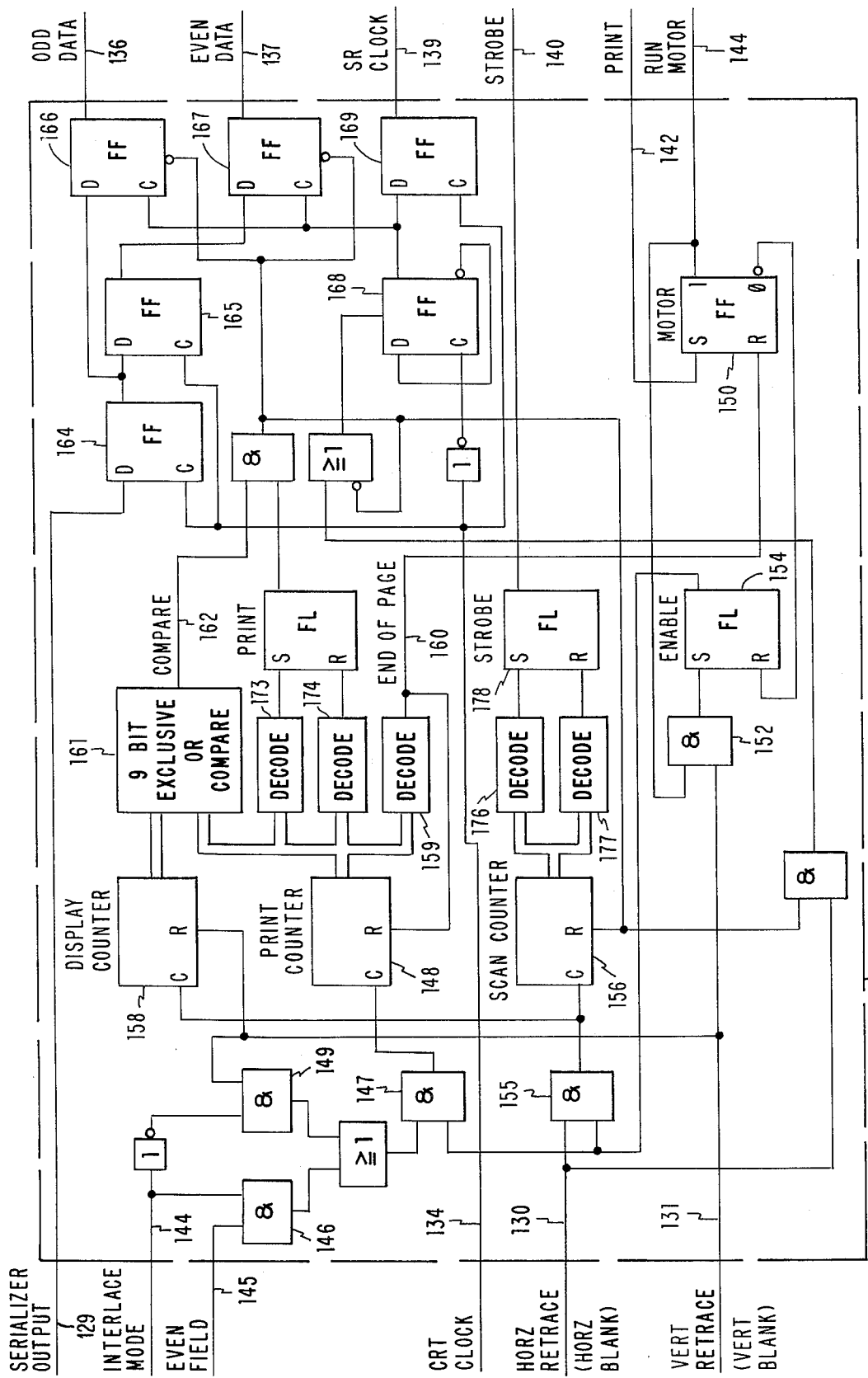
FIG. 13 shows the logic diagram of the display copy adaptor of FIG. 12.

A second embodiment of the invention is illustrated in FIGS. 11, 12 and 13. In this embodiment the thermal printer uses a print head 115 containing a single, horizontally aligned row of print dots for simultaneous printing of all dots in a single 800 dot row. A schematically illustrated in the vertical section view of FIG. 11, the platen 116 is confronted by print head 115 which has the print elements in a single row along the surface of rod 117 at the point or line of tangency with platen 116. The conductors from the print elements lead to the print head card 118 which has the odd and even print dot connections at opposite surfaces to reduce the conductor congestion. The shift register and driver logic modules 119 for activating the print elements are mounted on a flexible printed circuit board 120 with the conductors leading to the print head formed on the interior surface 14. Connection of the flexible printed circuit board conductors on the print head card 118 is effected by clamping elements 123, 124 secured by bolts 125. The pressure contact is maintained by a pair of gasket type members 126 formed of a flexible material which has the characteristic of not taking a permanent set.

In FIG. 12 the CRT display portion is identical to the corresponding structures in FIG. 10 with the printer unit being connected to the digital serializer output and the control lines. The serializer output which comprises the stream of serial data bits is combined within the CRT 128 with the horizontal retrace and vertical retrace signals in conjunction with the CRT clock (FIG. 13) to form the composite video analog signal. By using the serialized digital output on line 129 and the horizontal and vertical signals on lines 130 and 131 respectively it is possible to directly load the shift registers 132 and 133 that activate the individual print head thermal print elements without the necessity of separating and converting analog data to digital form and clocking and resynchronizing the signals for printer operation as would be required should the composite video signal be selected as the vehicle for transferring data from the CRT display to the printer.

The display copy adaptor 135 (FIG. 13) receives the serializer output in parallel with the CRT 128 and also the same control signals as CRT 128, namely the CRT clock 134, horizontal retrace 130, and vertical retrace 131. The output of display copy adaptor 135 is odd data 136 and even data 137 which is occasioned by the particular device which uses an odd bit shift register 132 and an even bit shift register 133 to control the particular configuration of print head 115. In addition the shift register (SR) clock 139 controls the printer shift registers 132 and 133; strobe line 140 is used to gate the data from the shift registers 132, 133 to the print elements and the run motor line 141 controls movement of the platen 116 and the media that moves in unison therewith. One incoming line 142 initiates the print cycle upon actuation.

The display copy adaptor 135 includes a pair of input signals, interlace mode 144 and even field 145. If the interface mode line 144 is set high, AND 146 is satisfied each time the even field signal 145 indicates an even line on refresh cycle causing AND gate 147 to increment print counter 148 at the start of alternate vertical retraces. If the interface mode signal on line 144 is set low, AND 149 is satisfied during each vertical retrace signal causing AND gate 147 to increment print counter 148 once each retrace cycle.

The print operation is started by a signal on print line 142 that sets motor latch 150 causing the platen driving motor 151 to commence operation and the gate 152 to be satisfied upon the occurrence of the next subsequent vertical retrace signal on line 131. The output of gate 152 sets enable latch 154. The set condition of latch 154 permits AND gate 155 to increment the scan counter 156 and display counter 148 each time a horizontal retrace signal occurs. The vertical retrace signal also resets display counter 158 while print counter 148 is reset by the output on line 160 from decode 159 which is satisfied when the print line total is equal to the total number established for the print page. This permits the feeding of paper after the last printed scan lines such that a sufficient margin and paper exit is established.

Display counter 158 keeps track of the number of horizontal refresh cycles since the preceding vertical refresh cycle while print counter 148 identifies the next line to be printed and associated therewith the position of the paper with respect to the print head. When the display counter 158 and print counter 148 are equal, compare circuit 161 generates a compare signal on line 162.

Serial data on line 129 is continuously clocked through the two position shift register formed by flip-flops 164, 164 and clocked into odd and even register positions in the flip-flops 166, 167. A compare on line 162 causes the normal set condition of flip-flop 168 to be removed thereby permitting flip-flops 168, 169 to clock data from register flip-flops 166, 167 to the respective odd and even shift registers 132, 133 of the printer. Compare signal on line 162 is considered to satisfy AND gate 170 since print latch 172 is normally set, the decodes 174, 173 respectively reset and set the latch 172 to enable the skipping of lines that are not to be printed. The shift register clock (SR clock) signal 139 clocks data from buffer latches 166, 167 during alternate CRT clock pulses.

When a line of 800 print dots have been alternately clocked into odd and even registers 132, 133 the horizontal retrace signal on line 130 increments display counter 158 to terminate the compare signal on line 162. The scan counter which was reset by the compare signal continues to be incremented by horizontal retrace signals. When decode 176 is satisfied strobe latch 178 is set and when decode 177 is satisfied latch 178 is reset. The decodes 176, 177 are set to provide a set condition of strobe latch 178 and an output signal on strobe line 140 commencing at a time when shift register latches contain the line of data to be printed and continuing for a period equivalent to the print time or burn time for the print head. The strobe pulse on line 140 simultaneously activates all gates 180 connecting the positions of shift registers 132, 133 with the print head such that each print dot associated with a shift register position containing positive data is energized. This time duration is typically in the relm of 4 mille seconds using the thin film print head of this embodiment.

The end of page signal on line 160 terminates the print operation. This signal resets motor latch 150 to stop platen motor 151 and paper motion, while the reset condition also resets enable latch 154 to inhibit the incrementing of counters 148, 156 and 158. The display copy adaptor operation is thereby precluded until another actuation of the print switch 181 (FIG. 12) occurs.

While the preferred embodiments of the invention have been illustrated and described in the foregoing, it is to be understood that it is not intended that the invention be limited to the precise constructions herein disclosed and the right is reserved to all changes and modifications coming within the scope of the invention as defined in the appended claims.

Having thus described my invention, what is claimed as new and desired to be secured by Letters Patent is:

1. In combination with a cathode ray tube (CRT) display device of the type that generates serial digital raster display data, horizontal retract blanking data and vertical retrace blanking data which are combined into a composite video signal by CRT circuitry using a train of clock pulses with said composite video signal utilized to selectively illuminate the CRT screen by continuously refreshing horizontal rows of dot positions; thermal printer and interface means for reproducing the information shown on such CRT display screen on a thermographic medium comprising:

thermal print means including a row of thermal print elements having a print element for each dot position of a raster scan row on said CRT screen;

buffer means for retaining a line of serial digital raster display data;

print control means including gating means for selectively actuating said thermal print elements in accordance with information retained in said buffer means; and connecting means for interfacing serial digital raster display data line by line simultaneously to said buffer means and said CRT circuitry, whereby the same raster bit data is used by both display and printer without the need to separate data bits from other information and resynchronize data for print purposes.

2. The thermal printer of the combination of claim 1 wherein said gating means gates one line of said serial digital raster data during each refresh cycle of said CRT display.

3. The thermal printer of the combination of claim 2 wherein said display screen includes character information for displaying characters and character boundary information defining conditions intermediate characters, and said print control means includes discriminating means for excluding character boundary information, whereby only character information is printed on said thermographic medium.

4. A thermal printer for printing the screen content of a raster scan cathode ray tube (CRT) display device wherein serial digital raster display data, horizontal blanking data, vertical blanking data and a train of clock pulses are generated by said device and combined by CRT circuitry into a composite video signal to control the illumination of the device CRT tube comprising:

thermal print means having a horizontal row of thermal print dot elements as numerous as the number of dot positions in one raster scan of display information on said CRT tube;

buffer means for storing serial digital data;

print control means including gating means for selectively actuating said thermal print dot elements in accordance with the content of said buffer means, and connecting means for simultaneously interfacing serial digital raster display data line by line to both said buffer means and said CRT circuitry.

5. The thermal printer of claim 4 wherein said gating means is selectively actuated to gate a sequence of serial digital data associated with one raster scan line during each refresh cycle of said CRT display.

6. The thermal printer of claim 4 wherein said gating means gates the serial digital data associated with the first raster scan line of said CRT display during an initial refresh cycle and thereafter gates the respective next raster scan line serial data during each succeeding refresh cycle.

7. The thermal printer of claim 5 further comprising:

print media advance means for moving a thermographic print medium past said thermal print means at substantially right angles to said row of thermal print dot elements and advance regulating means for continuously advancing the thermographic medium past said thermal print means a distance equivalent to the spacing of adjoining dots during each CRT refresh cycle.

* * * * *